H. GARDE & A. J. ADAMS.
ELECTRODE OF SECONDARY BATTERIES.
APPLICATION FILED APR. 14, 1910.
1,046,288.
Patented Dec. 3, 1912.
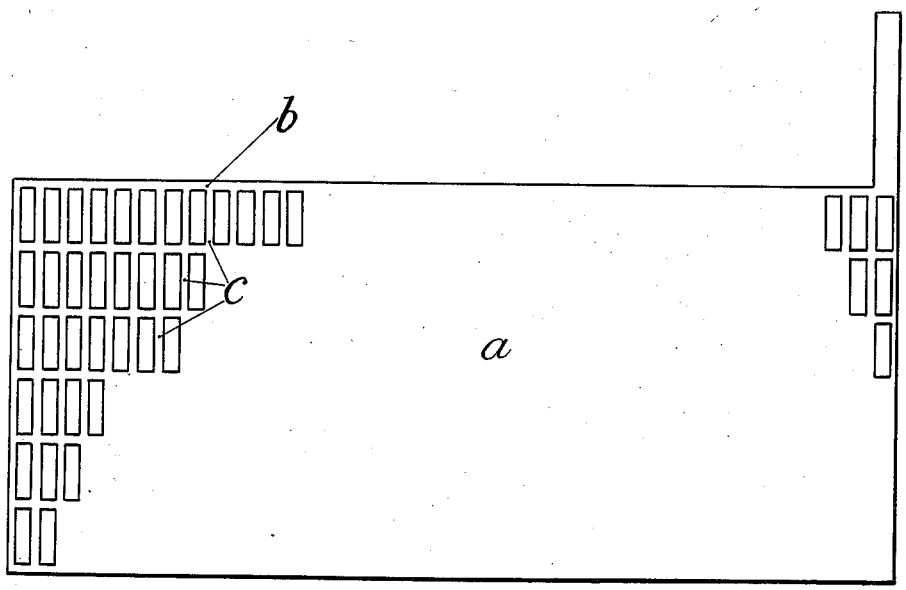
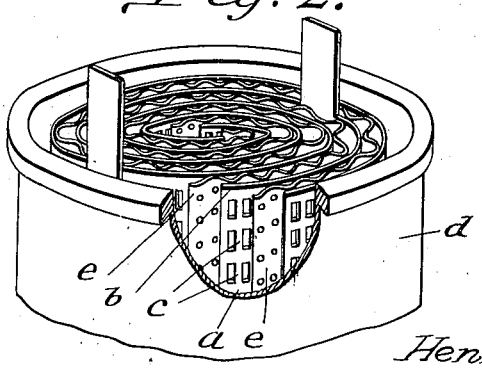
Witnesses
F. Stapel.
A. J. Moran
Inventors
Henry Garde
Alfred James Adams
by B. Singer
Att'y

UNITED STATES PATENT OFFICE.

HENRY GARDE AND ALFRED JAMES ADAMS, OF LONDON, ENGLAND.

ELECTRODE OF SECONDARY BATTERIES.

1,046,288.  Specification of Letters Patent.  Patented Dec. 3, 1912.

Application filed April 14, 1910. Serial No. 555,490.

*To all whom it may concern:*

Be it known that we, HENRY GARDE and ALFRED JAMES ADAMS, both of London, England, have invented a certain new and useful Improvement in the Electrodes of Secondary Batteries, of which the following is a specification.

This invention relates to improvements in the electrodes of secondary batteries of the Faure or pasted type, and has for its object to provide thinner electrodes of greater porosity than have heretofore been in use which will not grow, buckle, bend or otherwise lose their shape.

The buckling of accumulator plates is one of the greatest sources of trouble to users of secondary batteries. This disadvantage is particularly manifest in electrodes of the spiral roll type in consequence of there being no room to accommodate the growth. The result of this is, that the positive plates tend to press upon the negatives and cause short circuiting. This growth is confined to the positive plates and is caused by the growth or expansion which takes place in the active material in the course of "formation" or peroxidation. This growth is very considerable and increases with the amount of active material contained in a plate. It exercises very great pressure or expansive force on the support or grid, and if the latter is made of non-expansible material such as antimonial lead and is of sufficient strength to resist the expansive force being so exerted, the active material will become compressed with the result that its porosity will be diminished. On the other hand, if the support or grid is not of sufficient strength all through to so resist the said expansive force, it will either break, bend or buckle wherever the resistance is too little. If however supports or grids are ductile or expansible and not of sufficient thickness or strength to resist the said expansive force, the active material will be allowed to expand and the growth will continue to take place over the entire area of the plate until the active material becomes completely peroxidized, the support or grid expanding with the active material. In order however to preserve the original shape of the plate and prevent it from bending or curving on the edges and corners, the bridges or members must not be of greater thickness or strength on the outside or margins than in the inside or middle of the plate or in other words there must be no frame surrounding the support or grid. By taking these precautions the growth of the active material takes place equally all over the plate and when said growth is completed, the plate will be of the same shape as it originally was, but have considerably greater surface and more porosity.

It has previously been proposed to produce cylindrical positive electrodes by pasting pierced sheets or skeletons of soft lead with active material reducing the plates electrolytically and subjecting them to strong pressure in molds to give them the desired shape, but in this process the growing of the plates by peroxidation was effected after the plates had been pressed into shape and after they had been arranged in position in their containing vessels, the growth being, in fact, utilized to cause the plates to expand tightly against the walls of their containing vessels. Such a process is, however, not suitable for plates of the spiral roll type on account of the liability of the expansion causing short circuiting.

Our invention, however, consists in employing lead grids or supports having their edges or margins of no greater strength than the bridge pieces or cross members, and so treating the electrodes that they are grown to the full extent by peroxidation while in the flat condition, and when thus fully grown are reduced to a spongy lead condition by electrochemical action and are finally rolled into the form of a double or multiple roll or spiral and inserted into their containing vessels. By this means no further growth can take place after rolling and thus the danger of buckling and short circuiting is minimized.

In the drawing: Figure 1 illustrates one form of grid for the manufacture of electrodes in accordance with my invention. Fig. 2 is a perspective view of the plate inserted in a containing metal.

In carrying our invention into practice, grids or supports $a$ of soft lead or some other ductile or expansible suitable metal or alloy having their edges $b$ and bridges $c$ of the same thickness and strength as the rest of the plate, are covered with a paste made up of lead oxid and sulfuric acid, and after being allowed to set and dry are reduced to a spongy lead condition or formed negative in a forming bath of sulfuric acid of suitable density. They are then removed from the forming bath and subjected to strong pressure between sheets of wool or felt so as to increase the cohesion of the active material. They are then allowed to dry in the course of which they become hot owing to the oxidation of the spongy lead in the atmosphere or preferably they may be dried in a strong current of air which will prevent the heating. When thoroughly dry they are replaced in the forming tanks and formed positive or peroxidized at a medium current when it will be noticed that the growth above referred to will take place to an extent dependent upon how far the formation is pushed. They are then completely discharged or reversed to the same extent and afterward again charged at a heavier current when the growth will be still found to continue to increase. This process may be repeated one or more times at a gradually heavier current until the growth ceases, at which stage the active material may be regarded as fully peroxidized. The plates are then again discharged and reversed until they become again in the spongy lead state when they are again removed from the forming tanks and again pressed. They will now be found to have a much greater area than before and the active material in them will be of greater porosity. The plates are then rolled into the form of a double or multiple roll or spiral after which they are inserted in their containing vessels $d$ with separators $e$ of insulating material between them and charged in the ordinary way.

What we claim and desire to secure by Letters Patent is:

1. The process for manufacturing electrodes for secondary batteries consisting in pasting lead supports with a paste composed of lead oxid and sulfuric acid, allowing the pasted electrodes to set and dry, reducing the electrodes to spongy lead by forming them negative in a forming bath of sulfuric acid, subjecting them to strong pressure, again drying them, then forming them positive whereby they become peroxidized and finally charging and discharging them a plurality of times, and using a gradually heavier current for each successive charging until they are completely peroxidized and grown to their full extent, substantially as specified.

2. The process for manufacturing spiral electrodes for secondary batteries consisting in pasting lead supports with a paste composed of lead oxid and sulfuric acid, allowing the pasted electrodes to set and dry, reducing the electrodes to spongy lead by forming them negative in a forming bath of sulfuric acid, subjecting them to strong pressure, again drying them, then forming them positive whereby they become peroxidized and finally charging and discharging them a plurality of times and using therefor a gradually heavier current for each successive charging until they are completely peroxidized and grown to their full extent, then reducing the plate again to the spongy lead state, then again pressing and finally rolling them into the required shape while in the said spongy lead state, substantially as specified.

In testimony whereof we have affixed our signatures in presence of two witnesses.

HENRY GARDE.
ALFRED JAMES ADAMS.

Witnesses:
   H. D. JAMESON,
   R. WILLIAMS.